(12) United States Patent
Chuang

(10) Patent No.: US 10,234,046 B2
(45) Date of Patent: Mar. 19, 2019

(54) CHECK STRUCTURE AND HYDRAULIC BRAKING SYSTEM HAVING THE SAME

(71) Applicant: LEE CHI ENTERPRISES COMPANY LTD., Changhua (TW)

(72) Inventor: Hsiang-Yu Chuang, Changhua (TW)

(73) Assignee: LEE CHI ENTERPRISES COMPANY LTD., Changhua (TW)

( * ) Notice: Subject to any disclaimer, the term of this patent is extended or adjusted under 35 U.S.C. 154(b) by 76 days.

(21) Appl. No.: 15/436,445

(22) Filed: Feb. 17, 2017

(65) Prior Publication Data
US 2018/0073646 A1 Mar. 15, 2018

(30) Foreign Application Priority Data
Sep. 10, 2016 (TW) .............................. 105214017 U

(51) Int. Cl.
| | |
|---|---|
| F16K 15/02 | (2006.01) |
| B62L 3/02 | (2006.01) |
| F15B 7/06 | (2006.01) |
| B60T 7/10 | (2006.01) |
| B60T 11/16 | (2006.01) |
| B60T 17/04 | (2006.01) |

(52) U.S. Cl.
CPC ............ *F16K 15/026* (2013.01); *B60T 7/102* (2013.01); *B60T 11/16* (2013.01); *B60T 17/04* (2013.01); *B62L 3/023* (2013.01); *F15B 7/06* (2013.01)

(58) Field of Classification Search
CPC ...... B62L 3/023; F16K 15/026; F16H 7/0836; F16H 7/0848; B60T 7/102; B60T 17/04

USPC ................................... 137/538, 542, 543.23
See application file for complete search history.

(56) References Cited

U.S. PATENT DOCUMENTS

| | | | | | |
|---|---|---|---|---|---|
| 1,984,328 | A | * | 12/1934 | Bechtold | ............... F16K 15/063 137/543.23 |
| 3,565,100 | A | * | 2/1971 | Pfleger | ................. F16K 15/026 137/269.5 |
| 2016/0200392 | A1 | | 7/2016 | Bradley et al. | |

FOREIGN PATENT DOCUMENTS

TW M310861 U 5/2007

OTHER PUBLICATIONS

Abstract of TWM31086, Total p. of 1.

* cited by examiner

*Primary Examiner* — P. Macade Nichols
(74) *Attorney, Agent, or Firm* — Lynette Wylie; Apex Juris, pllc.

(57) ABSTRACT

A hydraulic braking system includes a base, which has an oil chamber and a connecting hole communicating with each other, a seat, which is provided in the oil chamber and has a receiving space communicating with the oil chamber and the connecting hole, a check valve movably provided in the receiving space and the connecting hole, and an elastic member. When one end of a connecting pipe which is connected to a brake actuator is inserted into the connecting hole to engage the base, the check valve is pushed inward to inject the hydraulic fluid in the oil chamber into the connecting pipe; when the connecting pipe is detached from the base, the check valve is pushed by the elastic member, and therefore returns to the original position. Whereby, the hydraulic fluid is prevented from leaking out.

16 Claims, 15 Drawing Sheets

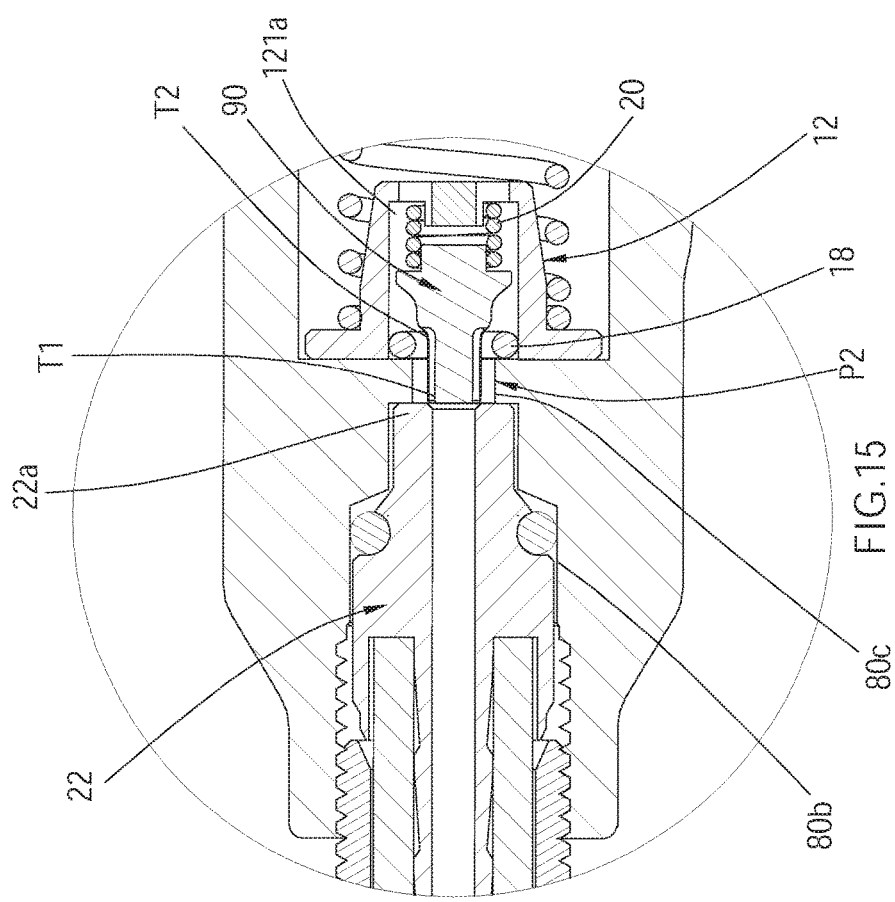

CHECK STRUCTURE AND HYDRAULIC BRAKING SYSTEM HAVING THE SAME

BACKGROUND OF THE INVENTION

1. Technical Field

The present invention relates to a check mechanism for liquid, and more particularly to a check structure and a hydraulic braking system having the check structure.

2. Description of Related Art

A conventional hydraulic braking structure typically includes an oil chamber filled with hydraulic fluid and a tubing, wherein the oil chamber is provided in a lever base, and one end of the tubing is connected to the lever base to communicate with the oil chamber, while another end thereof is connected to a brake actuator. By pulling a brake lever to squeeze the hydraulic fluid in the oil chamber to flow into the brake actuator along the tubing, the braking effect could be achieved. A hydraulic braking structure disclosed in the Taiwan utility model patent. No. M310861 further provides an O-ring to improve the problem of leakage at the junction of the tubing and the lever base.

Although the problem of leakage is improved by said design, the hydraulic fluid in the oil chamber would still leak out at a connecting portion between the tubing and the lever base when the tubing is detached, which would not only contaminate the surrounding, but also cause the hydraulic fluid in the oil chamber to become insufficient. Therefore, while reassembling the tubing and the lever base, the hydraulic fluid should be replenished to make sure that the hydraulic braking structure could operate smoothly. In all aspects, the conventional hydraulic braking structure still has room for improvements.

In addition, U.S. Patent No. 20160200392, titled "Hydraulic Bicycle System", discloses a port valve provided between a hydraulic fluid chamber and a hydraulic hose connection port, and a helical compression spring provided between the port valve and a piston. By pushing the port valve to compress the helical compression spring, the position of the port valve could be changed, and therefore the hydraulic fluid chamber could communicate with the hydraulic hose connection port. Since the helical compression spring is mainly used to urge the piston to return to its original position, the elastic modulus of the spring should be high. However, a spring with high elastic modulus would increase the difficulty to move the port valve. In other words, a greater pushing force would be required to overcome the high elastic modulus while compressing the helical compression spring to move the port valve. In addition, because two ends of the helical compression spring respectively abut against the port valve and the piston, and both the port valve and the piston are movable components, it would be more difficult to move one of the objects once the other one is moved.

BRIEF SUMMARY OF THE INVENTION

In view of the above, the primary objective of the present invention is to provide a check structure and a hydraulic braking system having the check structure, which prevents liquid (such as hydraulic fluid) from leaking out.

To achieve the objective of the present invention, the present invention provides a hydraulic braking system, which includes a base, a seat, a check valve, and an elastic member. The base has an oil chamber and a connecting hole provided therein, wherein an end of the connecting hole communicates with the oil chamber, while another end thereof communicates with the outside of the base. The seat is provided in the oil chamber, wherein the seat has a receiving space communicating with the oil chamber and the connecting hole. The check valve is provided in the receiving space and the connecting hole, wherein the check valve is rod-shaped, and is movable between a first position and a second position; the check valve has a passage, which has an inlet and an outlet, wherein the outlet communicates with the connecting hole, and the inlet communicates with the receiving space when the check valve is located at the second position. On the other hand, the inlet does not communicate with the receiving space when the check valve is located at the first position. The elastic member is provided in the receiving space of the seat, wherein, in a normal condition, the elastic member urges the check valve to stay at the first position by pushing it.

The present invention further provides a hydraulic braking system, includes a base, a seat, a check valve, and an elastic member, wherein the base has an oil chamber and a connecting hole provided therein. The base further has a neck passage communicate the oil chamber and the connecting hole. The seat is provided in the oil chamber, and has a receiving space communicating with the oil chamber and the connecting hole. The check valve includes a rod passing through the neck passage, wherein at least one groove is recessed into an outer peripheral surface of the rod. The at least one groove has a first end located on an end surface of the rod and a second end located on a predetermined portion of the outer peripheral surface, wherein the first end communicates with the connecting hole. The check valve is movable between a first position and a second position. The elastic member is provided in the receiving space of the seat, wherein, in a normal condition, the elastic member urges the check valve to stay at the first position by pushing against the check valve; when the check valve is located at the first position, the second end thereof dis-communicates with the oil chamber; when the check valve is located at the second position, the second end thereof communicates with the oil chamber.

With the aforementioned design, the hydraulic fluid in the oil chamber would not leak out during assembling, and therefore the braking process could be performed smoothly.

BRIEF DESCRIPTION OF THE SEVERAL VIEWS OF THE DRAWINGS

The present invention will be best understood by referring to the following detailed description of some illustrative embodiments in conjunction with the accompanying drawings, in which

FIG. 15 is an enlarged partial view of FIG. 14.

DETAILED DESCRIPTION OF THE INVENTION

Figure 1:
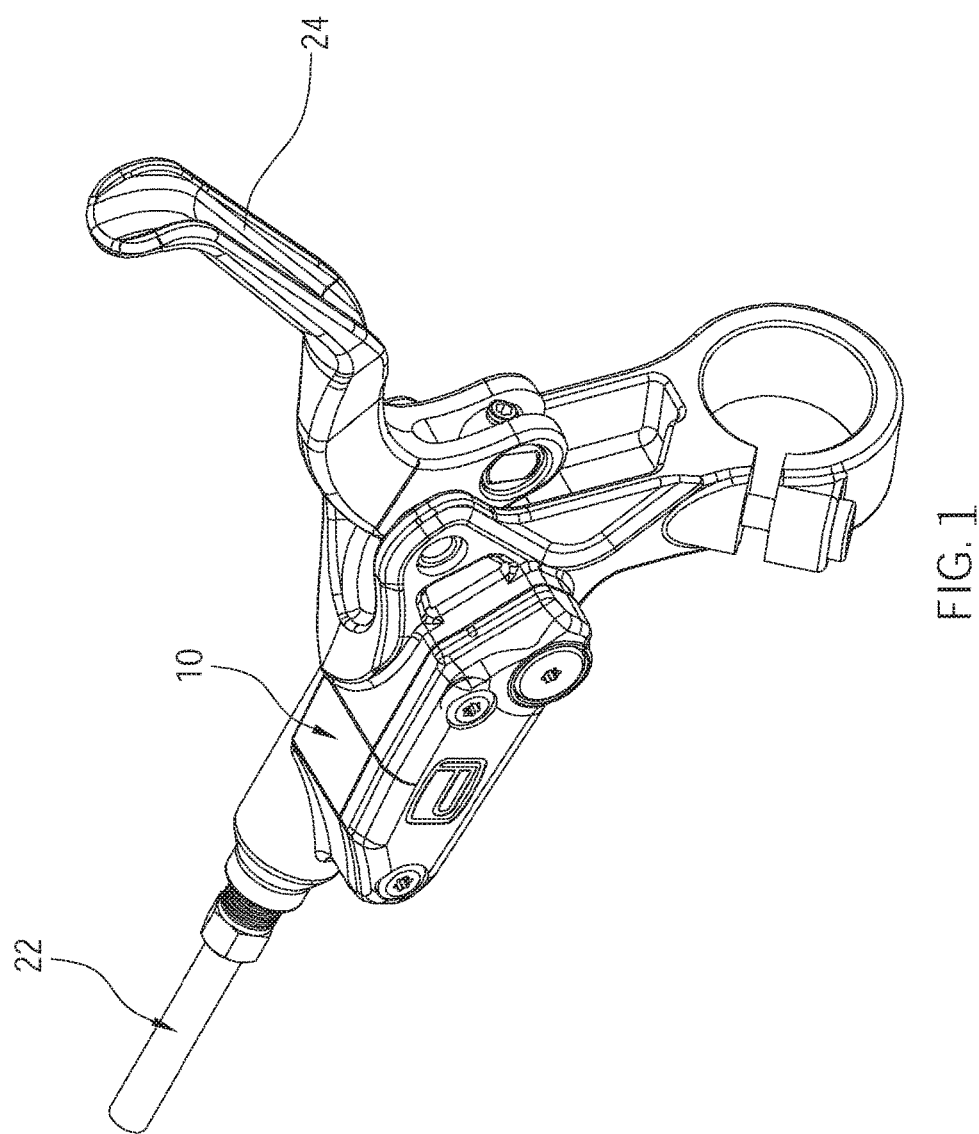
FIG. 1 is a perspective view, showing the hydraulic braking system of an embodiment of the present invention which has the check structure.
Figure 2:
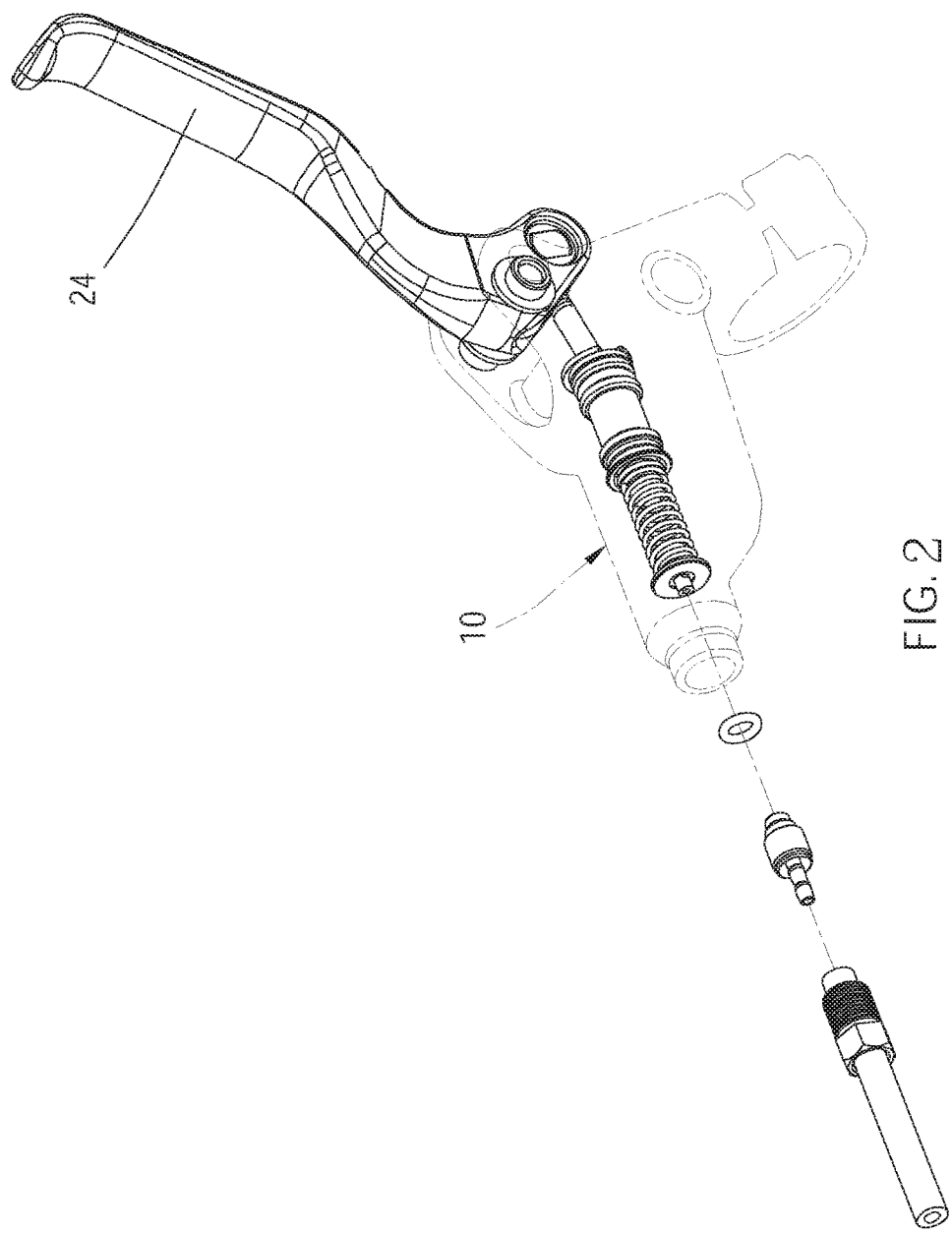
FIG. 2 is a perspective exploded view, showing parts of the components of FIG. 1.
Figure 3:
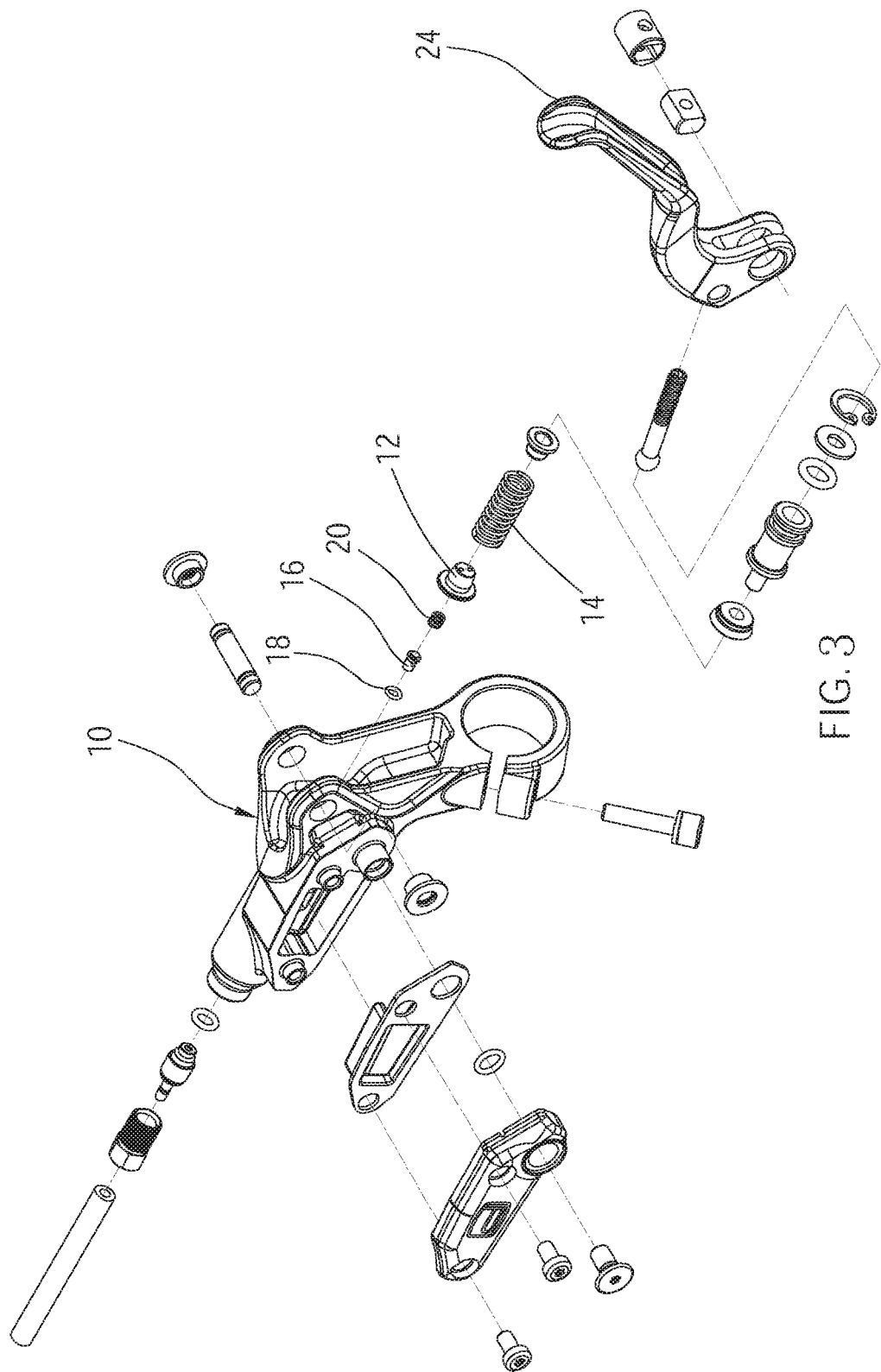
FIG. 3 is an exploded perspective view of the FIG. 1.
Figure 4:
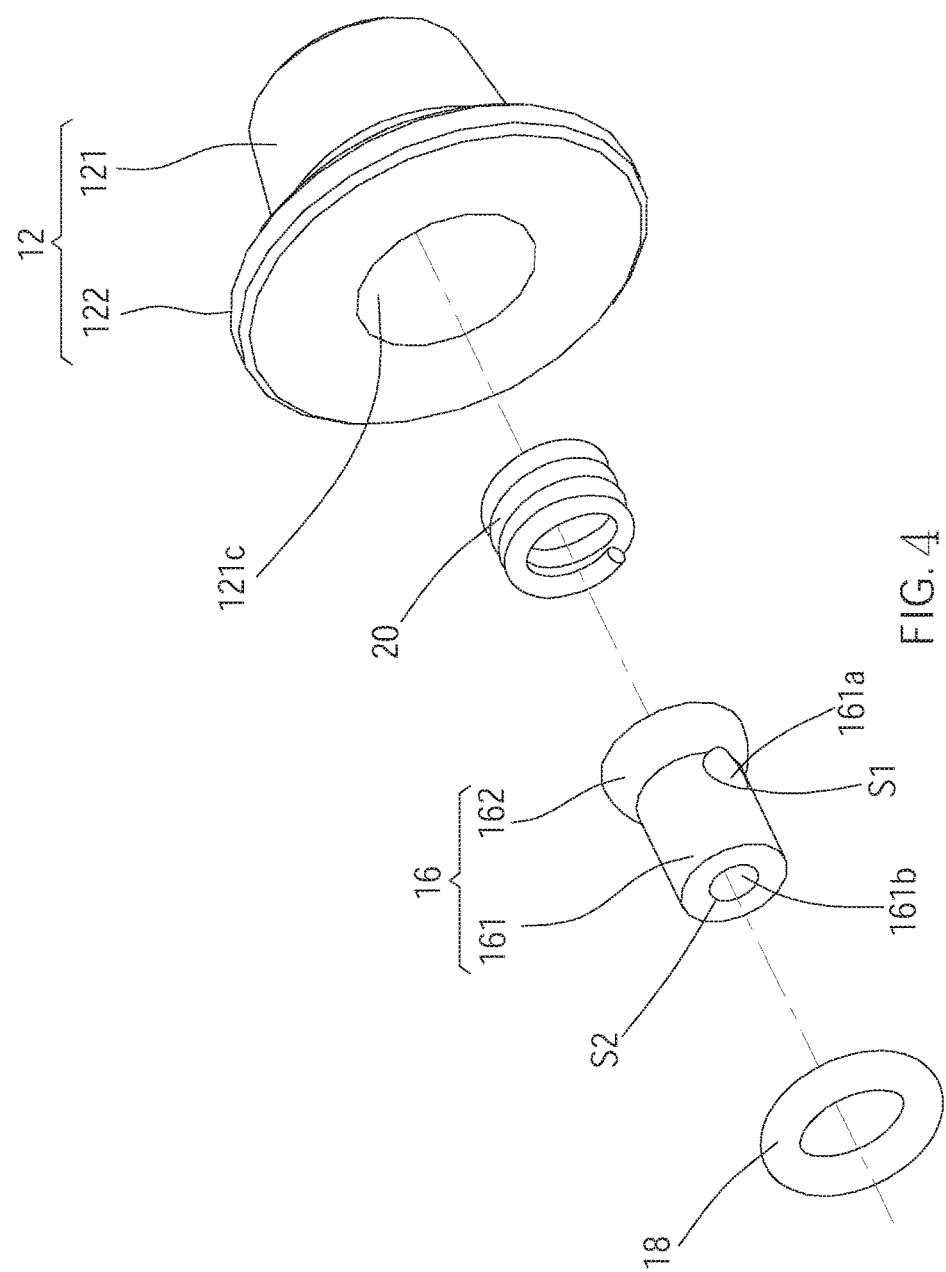
FIG. 4 is an exploded view, showing the seat, the check valve, the O-ring, and the elastic member.
Figure 5:
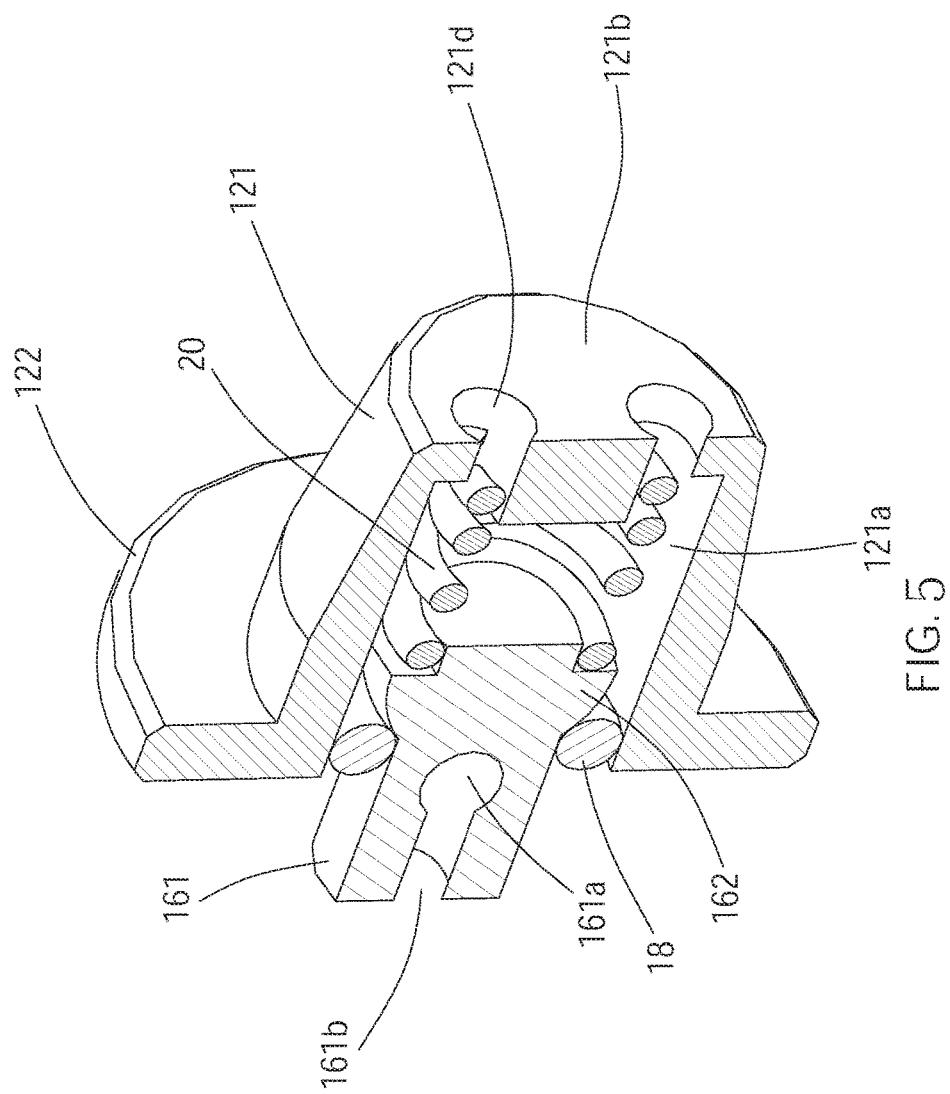
FIG. 5 is a sectional view, showing the combination of the components in FIG. 4.

A hydraulic braking system of an embodiment of the present invention, which has a check structure, is illustrated in FIG. 1 to FIG. 5, wherein the hydraulic braking system is applied to a structure, which is a bicycle braking system as an example. However, this is not a limitation of the present invention; the hydraulic braking system could be used in other systems or devices as well. The hydraulic braking system includes a base 10, a seat 12, a spring 14, a check valve 16, an O-ring 18, an elastic member 20, and a connecting pipe 22. An end of the connecting pipe is detachably connected to the base 10, while another end thereof is connected to a brake actuator (not shown). Said seat 12, said spring 14, said check valve 16, and said O-ring 18 constitute the check structure of the embodiment.

Figure 6:
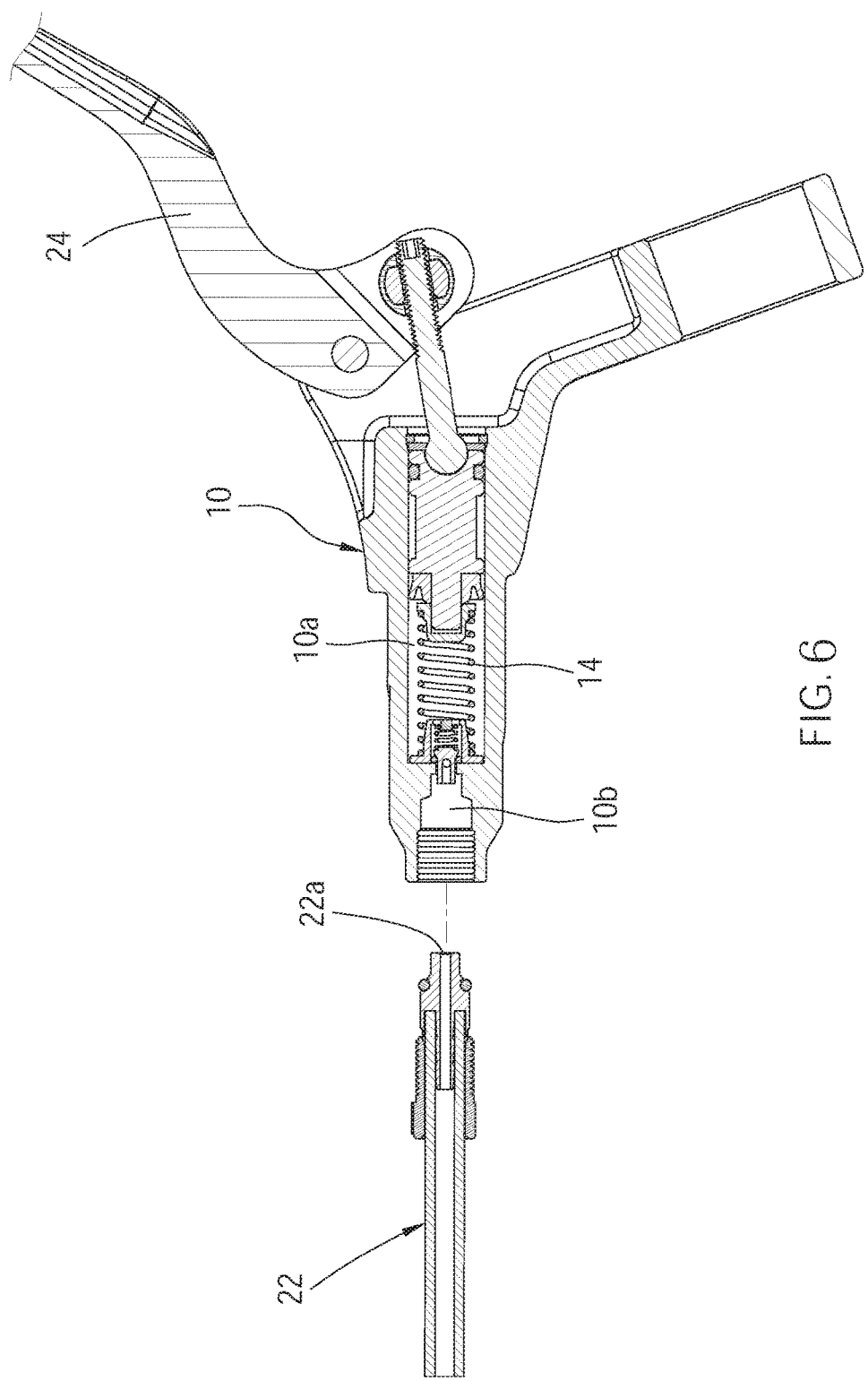
FIG. 6 is a sectional view, showing the connecting pipe not connected to the base.
Figure 7:
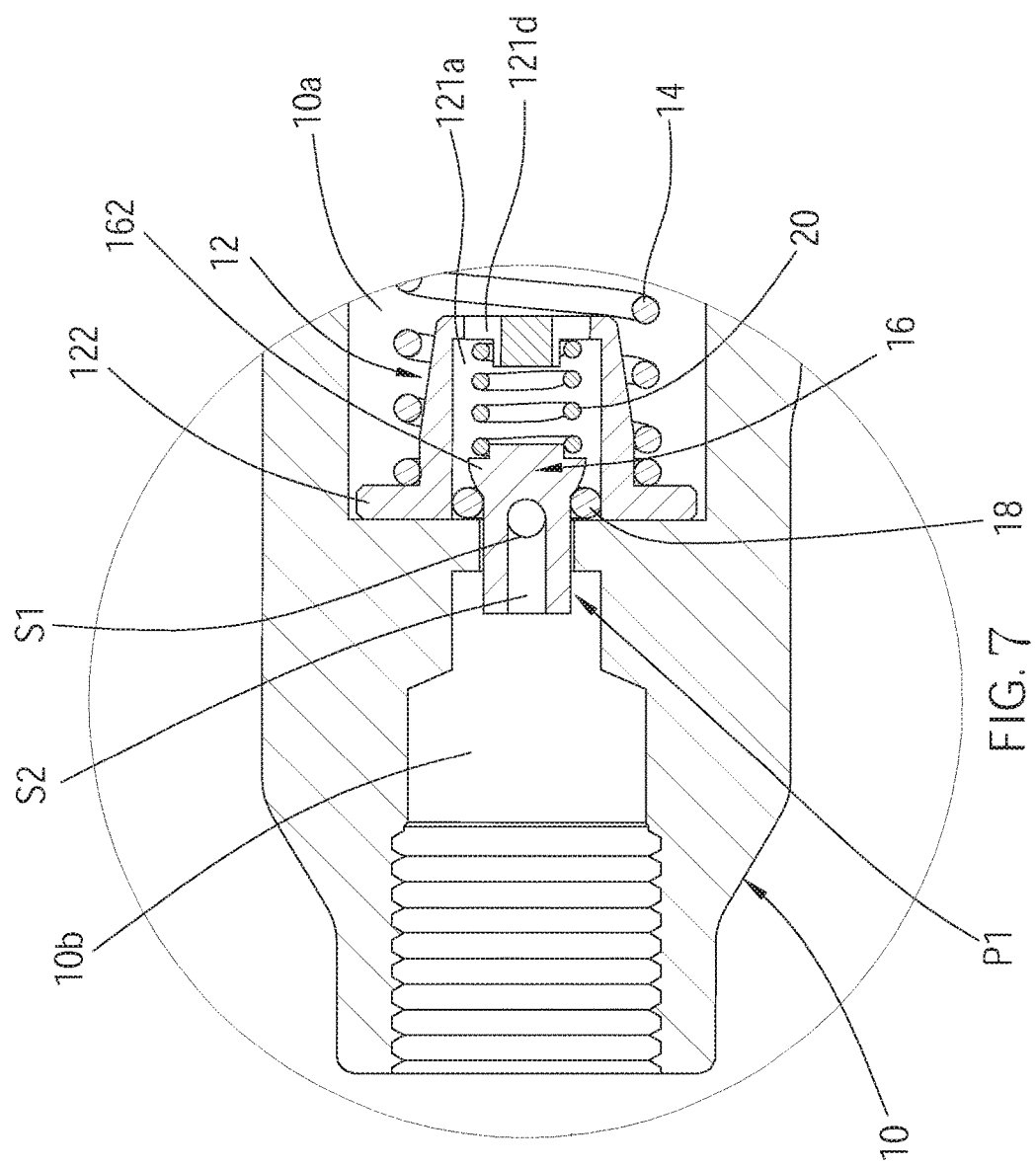
FIG. 7 is an enlarged partial view of FIG. 6.

The base 10 is provided on a handle of a bicycle, and is pivotally connected to a brake lever 24. As shown in FIG. 6 and FIG. 7, an oil chamber 10a and a connecting hole 10b is provided in the base 10, wherein an end of the connecting hole 10b communicates with the oil chamber 10a, while another end thereof communicates with the outside of the base 10. When the brake lever 24 is pulled, the hydraulic fluid in the oil chamber 10a is squeezed into the brake actuator along the connecting pipe 22 through a linking mechanism, whereby to provide a braking effect. However, the brake lever 24 and said linking mechanism are both conventional, and are not the essence of the present invention. Thus we are not going to describe them in details herein.

The seat 12 and the spring 14 are provided in the oil chamber 10a, wherein the seat 12 includes a tubular body 121 and a flange 122. The tubular body 121 is slightly cone-shaped, and has a receiving space 121a therein. A closed plate 121b is provided on a side of the tubular body 121, while another side thereof is an open end 121c. At least one bore 121d is provided on the closed plate 121b, wherein the at least one bore 121d communicates with the receiving space 121a and the oil chamber 10a, which allows the hydraulic fluid in the oil chamber 10a to enter the receiving space 121a through the at least one bore 121d. In the embodiment, the at least one bore 121d includes two bores. The flange 122 is connected to a bottom edge of the tubular body 121 on the side thereof having the open end 121c, wherein the flange 122 extends outwardly in a radial direction thereof. An end of the spring 14 abuts against the flange 122, while another end thereof abuts against one of the components of said linking mechanism. A force exerted by the spring 14 would urge the seat 12 to abut against an inner wall of the oil chamber 10a, whereby to keep the receiving space 121a communicating with the connecting hole 10b. In other words, the oil chamber 10a communicates with the connecting hole 10b through the receiving space 121a.

The check valve 16, the O-ring 18, and the elastic member 20 are provided in the receiving space 121a of the tubular body 121 of the seat 12. The check valve 16 includes a cylinder rod 161 and a round blocking flange 162 connected to the rod 161 at an end thereof. An outer diameter of the blocking flange 162 is greater than an outer diameter of the rod 161. The rod 161 has a radial bore 161a and an axial bore 161b provided therein, which communicate with each other to form a T-shaped passage. The passage has two inlets S1 and an outlet S2, wherein the inlets S1 are two ends of the radial bore 161a, while the outlet S2 is an end of the axial bore 161b communicating with the outside of the rod 161. The O-ring 18 is made of an elastic material, such as rubber. However, the selection of the material for making the O-ring 18 is not a limitation of the present invention. The O-ring 18 fits around the rod 161, and is located on one side of the blocking flange 162. Preferably, an inner edge and an outer edge of the O-ring 18 respectively abut against a surface of the rod 161 and an inner wall of the tubular body 121, whereby to provide a better sealing effect.

Figure 9:
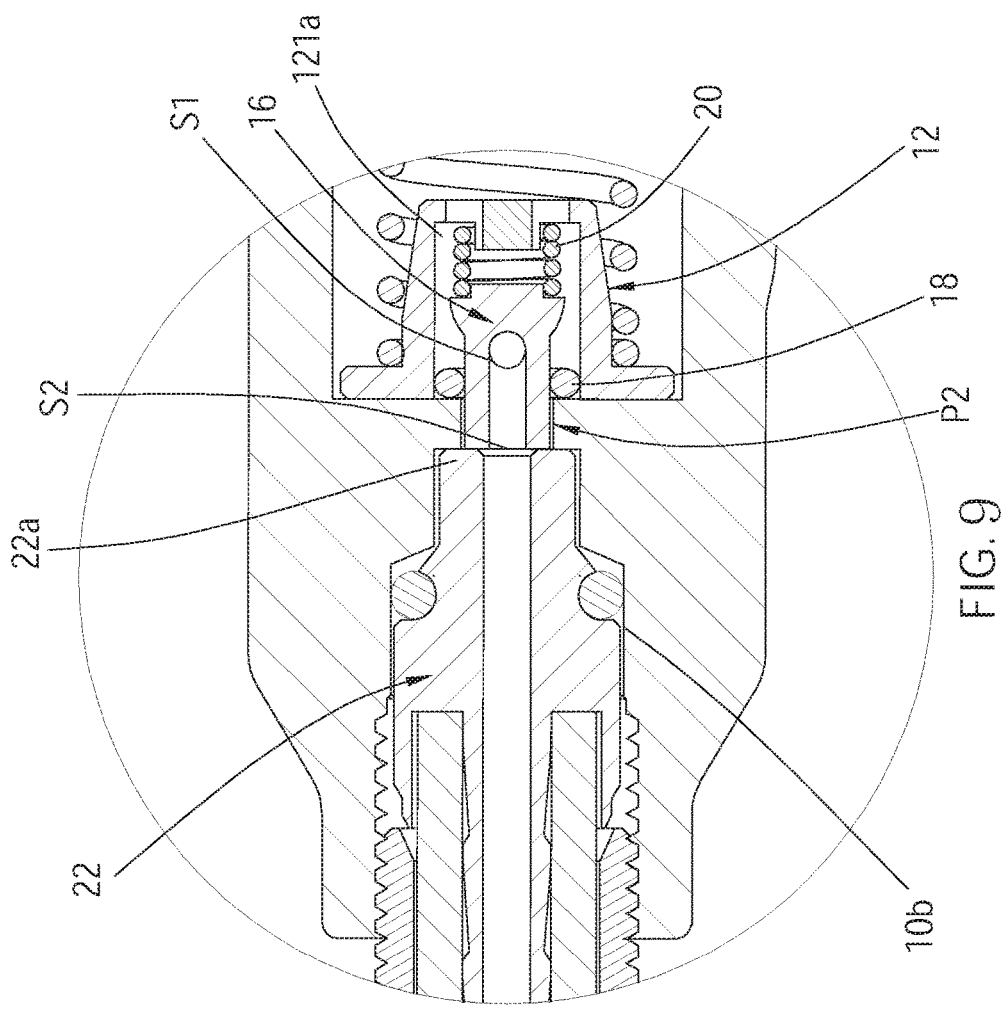
FIG. 9 is an enlarged partial view of FIG. 8.

The rod 161 of the check valve 16 is provided in the receiving space 121a and the connecting hole 10b, with the end thereof with the outlet S2 of the passage extending into the connecting hole 10b, so that the output S2 communicates with the connecting hole 10b. The O-ring 18 abuts against an inner wall of the oil chamber 10a near the connecting hole 10b. In the embodiment, the rod 161 could be moved between a first position P1 (shown in FIG. 7) and a second position P2 (shown in FIG. 9). The elastic member 20 is a spring, wherein an end thereof abuts against the blocking flange 162 of the check valve 16, while another end thereof abuts against an inner wall of the closed plate 121b of the tubular body 121. In a normal condition, the elastic member 20 would keep the check valve 16 staying at the first position P1 by pushing it. Said normal condition refers to a condition when the elastic member 20 is not compressed. The elastic member 20 would be compressed and deformed by moving the check valve 16 from the first position P1 toward the second position P2.

The connecting pipe 22 is not connected to the base 10 yet in the condition shown in FIG. 6 and FIG. 7. At this time, the check valve 16 is pushed by the elastic member 20 and therefore stay at the first position P1, and the inlets S1 of the passage do not communicate with the receiving space 121a. In this way, the hydraulic fluid in the oil chamber 10a would not leak out along the passage. In addition, the blocking flange 162 of the check valve 16 would push the O-ring 18 to abut against the inner wall of the oil chamber 10a, whereby to further prevent the hydraulic fluid from leaking out.

Figure 8:
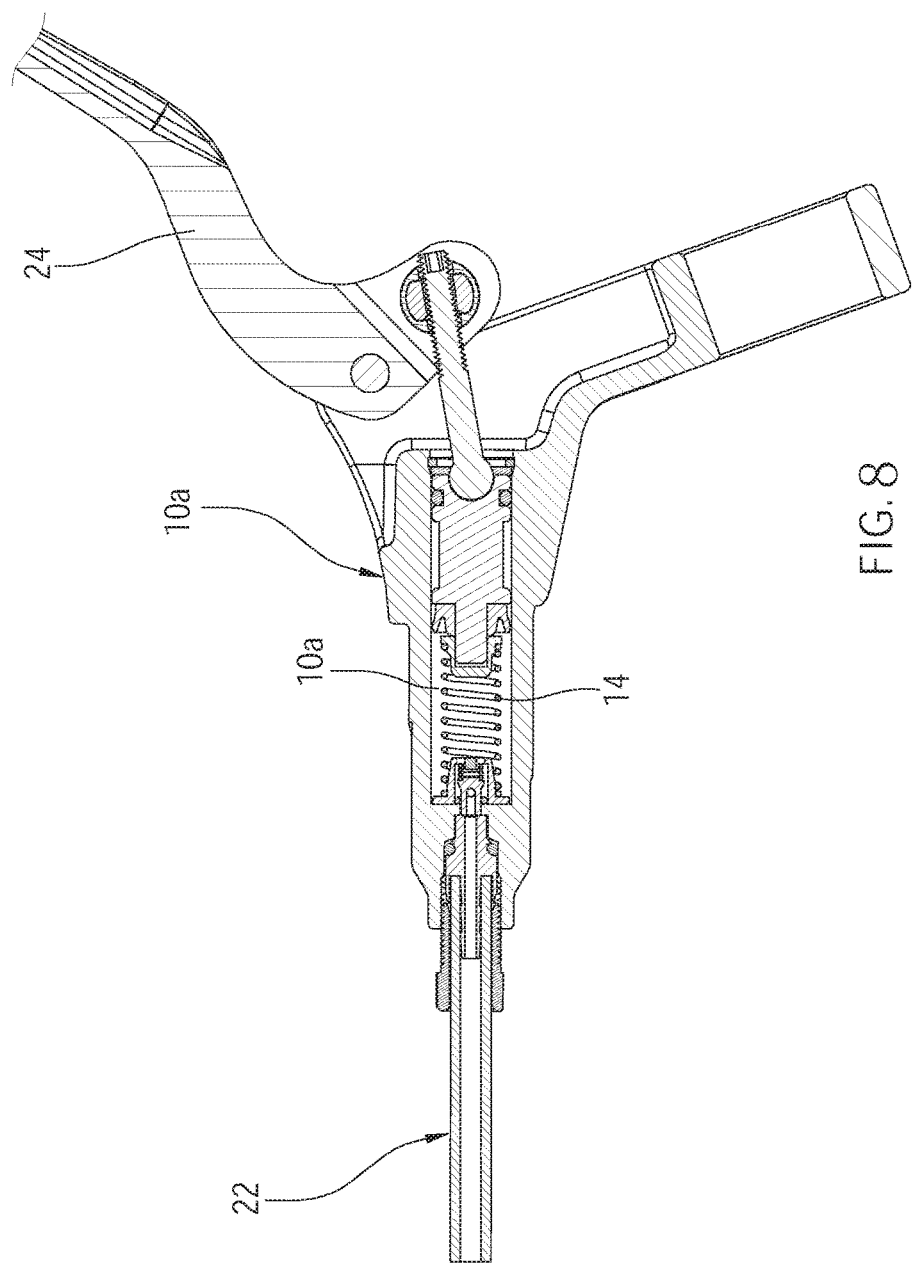
FIG. 8 is a sectional view, showing the connecting pipe connected to the base.

A pushing portion 22a is provided at one end of the connecting pipe 22. When one end of the connecting pipe 22 enters the connecting hole 10b of the base 10, as in the condition shown in FIG. 8 and FIG. 9, the pushing portion 22a of the connecting pipe 22 abuts against an end of the check valve 16 which extends into the connecting hole 10b, wherein the check valve 16 would be continuously pushed toward the receiving space 121a, and the elastic member 20 would be compressed and deformed consequently. When the check valve 16 arrives at the second position P2, the inlets S1 of the passage would communicate with the receiving space 121a. In the meantime, the hydraulic fluid in the oil chamber 10a could be injected into the connecting pipe 22 through the receiving space 121a and the passage.

Figure 10:
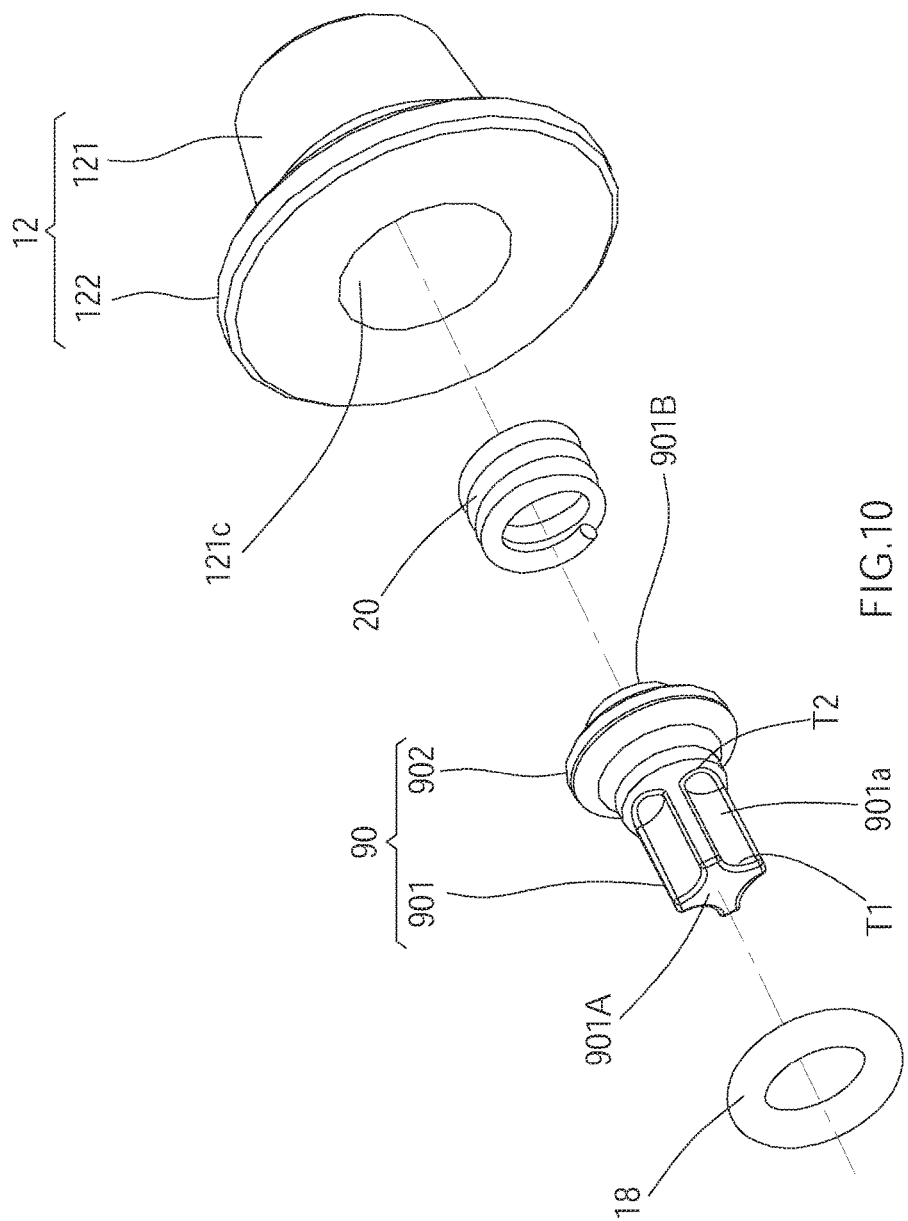
FIG. 10 is an exploded view, showing the seat, the check valve, the O-ring, and the elastic member of another embodiment of the present invention.
Figure 11:
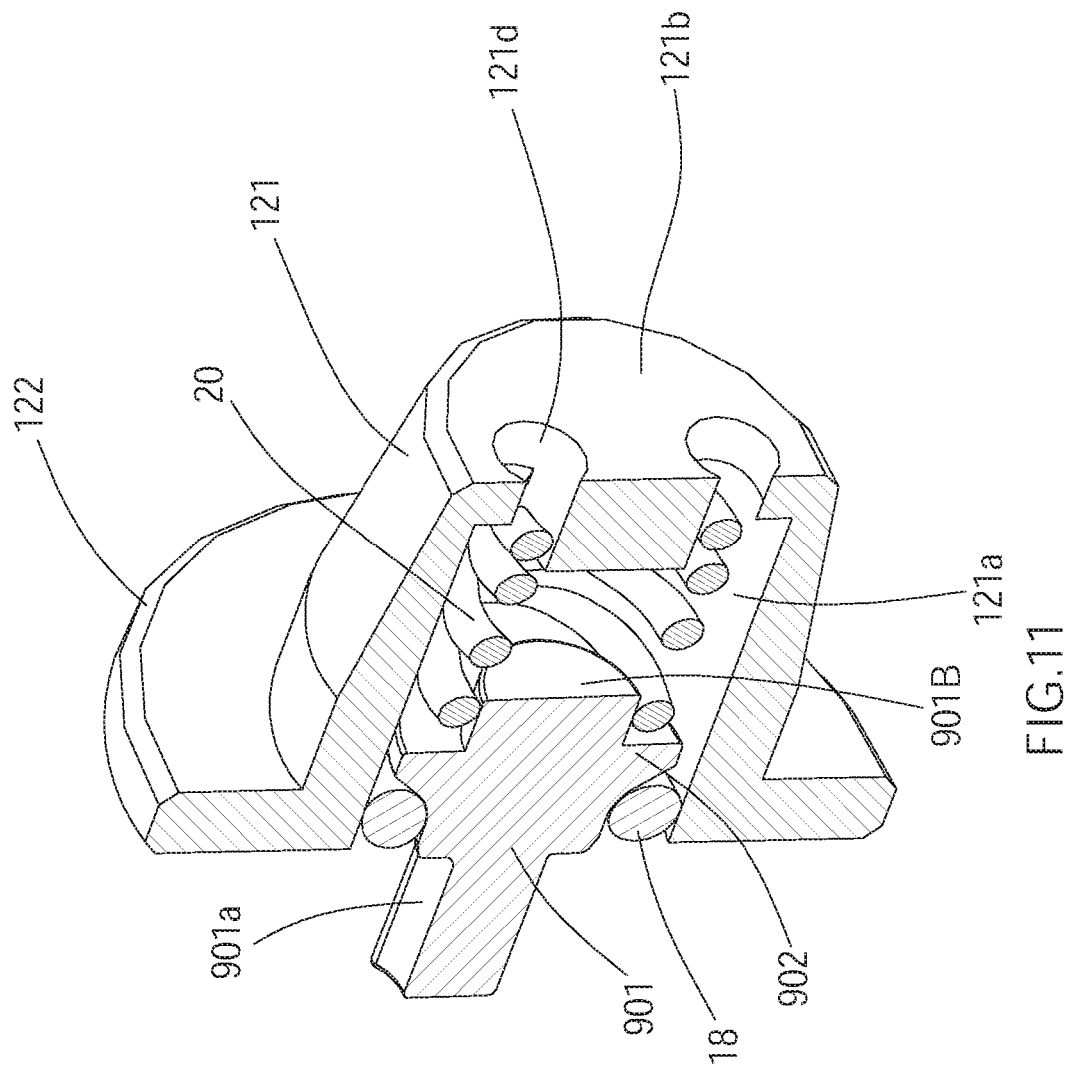
FIG. 11 is a sectional view, showing the structural combinations of the components in FIG. 10.

A hydraulic braking system of another embodiment of the present invention having a check structure is illustrated in FIG. 10 and FIG. 11, wherein the hydraulic braking system also includes the seat 12, the spring 14, the O-ring 18, the elastic member 20, and the connecting pipe 22 described in the previous embodiment. In addition, the hydraulic braking system of the current embodiment further includes a base 80 and a check valve 90 which are different from those of the previous embodiment. As describe above, one of the ends of the connecting pipe 22 is detachably connected to the base 80, while the other end thereof is connected to a brake actuator (not shown). In the current embodiment, said seat 12, said spring 14, said check valve 90, said O-ring 18, and said elastic member 20 constitute the check structure.

Figure 12:
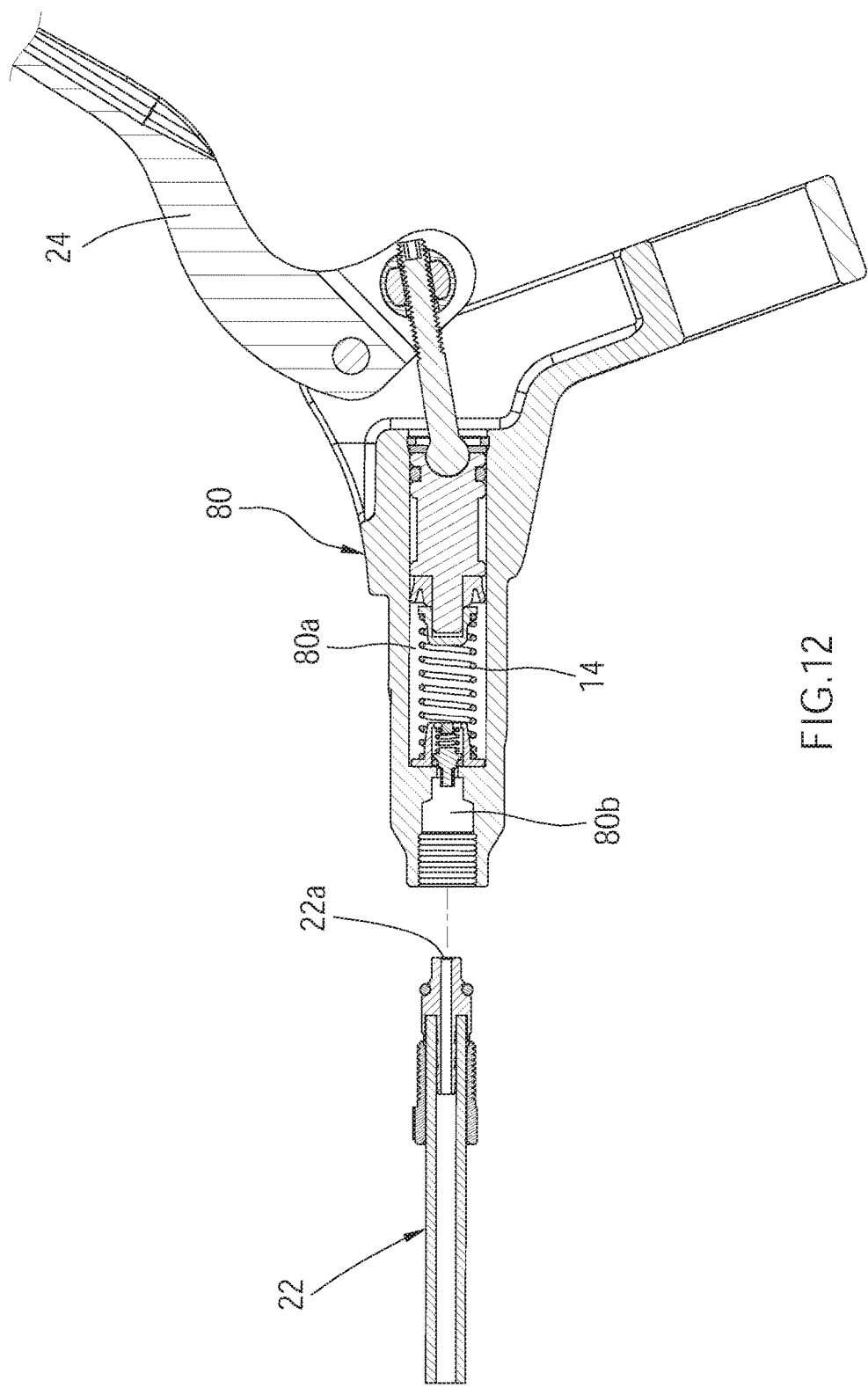
FIG. 12 is a sectional view, showing the condition when the connecting pipe is not connected to the base in the another embodiment.
Figure 13:
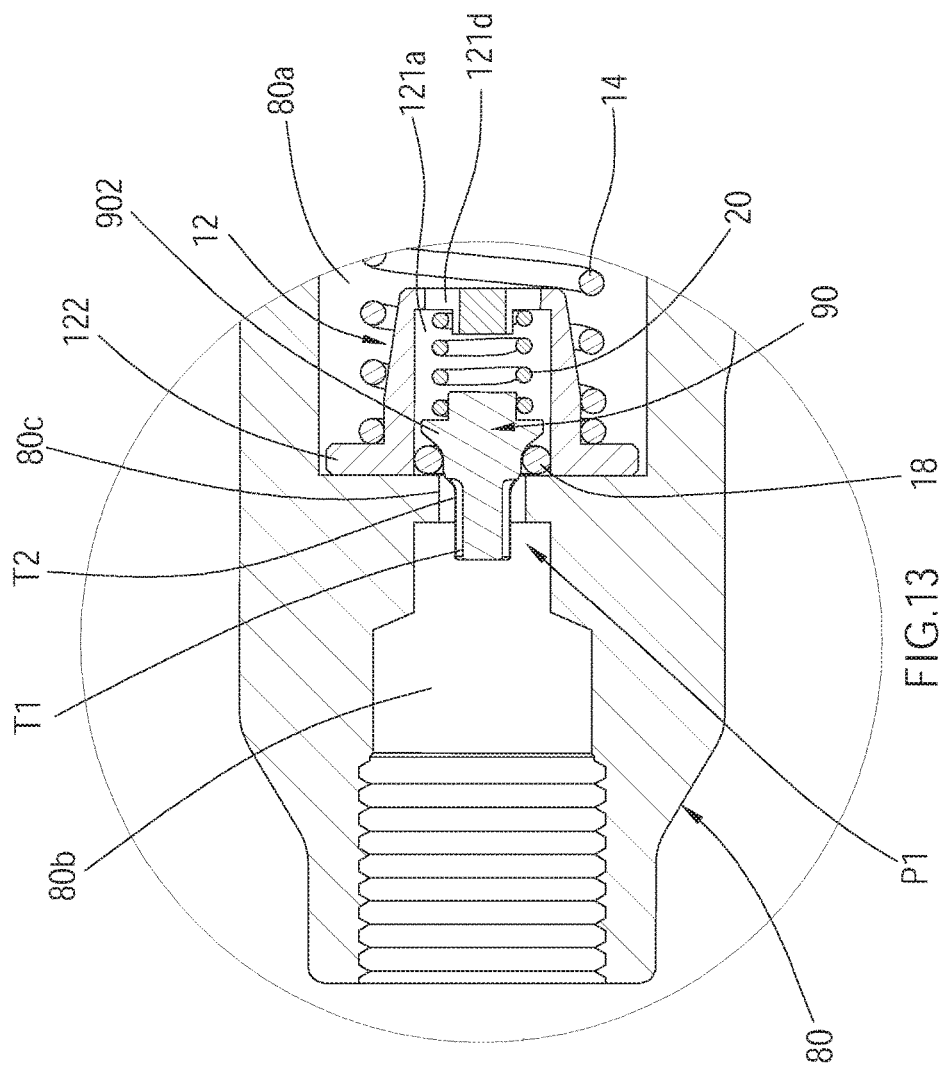
FIG. 13 is an enlarged partial view of FIG. 12.

In the current embodiment, the base 10 is also provided on a frame or a handle of a bicycle, and is pivotally connected to the brake lever 24. As shown in FIG. 12 and FIG. 13, an oil chamber 80a, a connecting hole 80b, and a neck passage 80c are provided in the base 80, wherein an end of the connecting hole 80b communicates with the outside of the base 80, while another end thereof communicates with the oil chamber 80a through the neck passage 80c. Similarly, when the brake lever 24 is pulled, the hydraulic fluid in the oil chamber 80a would be squeezed into the brake actuator along the neck passage 80c and the connecting pipe 22 through a linking mechanism, whereby to provide a braking effect. However, the brake lever 24 and said linking mechanism are not the essence of the present invention. Thus we are not going to describe them in details herein.

The seat 12 and the spring 14 are provided in the oil chamber 80a, wherein the structure of the seat 12 has described above. The at least one bore 121d provided on the closed plate 121b communicates with the receiving space 121a and the oil chamber 80a, which allows the hydraulic fluid to enter the receiving space 121a through the at least one bore 121d. In the current embodiment, the at least one bore 121d also includes two bores. The flange 122 is connected to the tubular body 121 on the side thereof which has the open end 121c, wherein the flange 122 extends outwardly in a radial direction thereof. One of the ends of the spring 14 abuts against the flange 122, while the other end thereof abuts against one of the components of said linking mechanism or an inner wall of the base 80. A force exerted by the spring 14 would urge the seat 12 to abut against the inner wall of the oil chamber 80a. On the other hand, the receiving space 121a communicates with the neck passage 80c. In the current embodiment, an end of the spring 14 is adapted to move the piston of the linking mechanism, and the tubular body 121 and the flange 122 are integrally made.

As mentioned in the previous embodiment, the check valve 90, the O-ring 18, and the elastic member 20 are provided in the receiving space 121a of the tubular body 121 of the seat 12. The check valve 90 includes a cylinder rod 901 and a round blocking flange 902 connected to the rod 901 at a body thereof, wherein the rod 901 and the round blocking flange 902 are integrally made, and an outer diameter of the blocking flange 902 is greater than an outer diameter of the rod 901. Two ends of the rod 901 are respectively an end surface 901A and an end surface 901B. The rod 901 is provided passing through the neck passage 80c in a movable manner, and a plurality of grooves 901a are recessed into an outer peripheral surface of the rod 901 in an axial direction thereof. Each of the grooves 901a has a first end T1 located on the end 901A of the rod 901, and a second end T2 formed on the outer peripheral surface of the rod 901, wherein the second end T2 is located between the end surface 901A and the end surface 901B. The end of the rod 901 which has the end surface 901A enters the connecting hole 80b to communicate the first ends T1 of the grooves 901a and the connecting hole 80b, while the other end of the rod 901 which has the end surface 901B is located in the oil chamber 80a. The blocking flange 902 is located between the seconds end T2 of the grooves 901a and the end surface 901B of the rod 901.

The O-ring 18 fits around the rod 901. Once these components are assembled, an inner edge of the O-ring 18 abuts against the blocking flange 902, and an outer edge of the O-ring 18 abuts against the inner wall of the tubular body 121 as well, whereby to provide a better sealing effect. In the current embodiment, the elastic member 20 is also a spring, wherein one of the ends thereof abuts against the blocking flange 902 of the check valve 90, while the other end thereof abuts against the inner wall of the closed plate 121b of the tubular body 121. In this way, as recited in the previous embodiment, the elastic member 20 could provide a force to move the check valve 90 toward a predetermined direction in a normal condition, wherein said normal condition refers to a condition when the elastic member 20 is not compressed.

The connecting pipe 22 is not connected to the base 80 yet in the condition shown in FIG. 12 and FIG. 13. At this time, the check valve 90 is pushed by the uncompressed elastic member 20. Whereby, the O-ring 18 would about against the inner wall of the oil chamber 80a near the neck passage 80c. Meanwhile, the check valve 90 is located at the first position P1 defined above. As explained in the previous embodiment, at this time, the second ends T2 of the grooves 901a of the check valve 90 do not communicate with the receiving space 121a, so that the hydraulic fluid in the oil chamber 80a would not leak out along the grooves 901a. In addition, the O-ring 18 would be compressed by the force exerted by the elastic member 20, which could further prevent the hydraulic fluid from leaking out as well.

Figure 14:
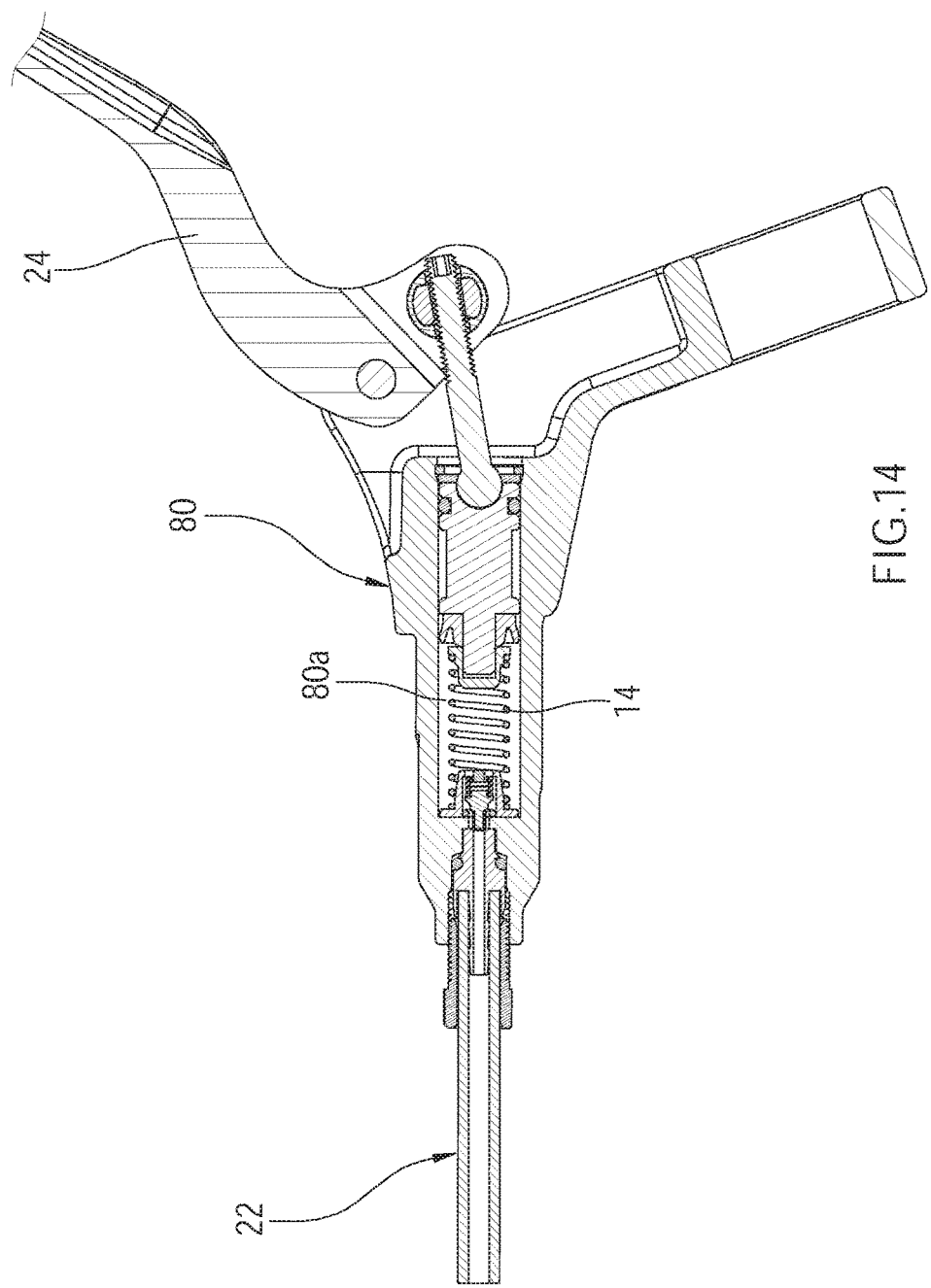
FIG. 14 is a sectional view, showing the condition when the connecting pipe is connected to the base in the another embodiment.

One of the ends of the connecting pipe 22 enters the connecting hole 80b of the base 80 in the condition shown in FIG. 14 and FIG. 15, wherein the pushing portion 22a of the connecting pipe 22 abuts against the end surface 901A of the rod 901 of the check valve 90. When the connecting pipe 22 is engaged with the connecting hole 80b of the base 80, the check valve 90 would be pushed toward the receiving space 121, and the elastic member 20 would be compressed and deformed consequently. At this time, the check valve 90 is located at the second position P2 defined above. Meanwhile, as recited in the previous embodiment, the second ends T2 of the grooves 901a of the check valve 90 communicate with the receiving space 121a, so that the hydraulic fluid in the oil chamber 80a could be injected into the connecting pipe 22 through the receiving space 121a and the grooves 901a.

Because the grooves 901a of the check valve 90 of the current embodiment are designed to simply recess into the outer peripheral surface of the rod 901, the process of making the grooves 901a could be simplified and accelerated. In addition, the extending direction of the grooves 901a is not necessary to be the axial direction of the rod 901, other directions would be acceptable as long as each of the grooves 901a could satisfy the condition that the first end T1 is located on the end surface 901A of the rod 901, and the second end S2 is located between the end surface 901A and the end surface 901B. That means, the grooves 901a could be helical in other embodiments.

It is worth mentioning that, the check structure of each of the aforementioned embodiments is constituted of said seat 12, said spring 14, said check valve 90, said O-ring 18, and said elastic member 20, and could be modularized. Therefore, the check structure could be easily installed or replaced. Also, said modular check structure could be pre-installed in a housing before being engaged with the base, which could be then installed at a disk, a caliper, or the middle section of the oil chamber.

Furthermore, since the spring 14 is used to urge the linking mechanism to return to its original location, a spring with high elastic modulus could be selected to ensure that the linking mechanism precisely goes back to the right position. On the other hand, since the elastic member is used to keep the check valve 16 biasing in a predetermined direction, and is provided in the receiving space 121a of the seat 12, a spring with low elastic modulus could be selected. By using two springs with different elastic modulus, the problem and the inconvenience caused by the conventional design that provides just one single spring between the check valve and the linking mechanism could be eased.

In conclusion, in the aforementioned embodiments, when the connecting pipe 22 is not connected to the base 10, 80, the hydraulic fluid in the oil chamber 10a, 80a would not leak out. When the connecting pipe 22 is connected to the base 10, 80, the hydraulic fluid in the oil chamber 10a, 80a could be injected into the connecting pipe 22. Furthermore, when the connecting pipe 22 is detached from the base 10, 80 again, the check valve 16, 90 would be urged by the force exerted by the elastic member 20 to return to the first position P1 in no time, whereby to prevent the hydraulic fluid from leaking out. Therefore, the hydraulic fluid in the oil chamber 10a, 80a could be ensured not to leak out while connecting and disconnecting the connecting pipe 22.

It must be pointed out that the embodiments described above are only some preferred embodiments of the present invention. All equivalent structures which employ the concepts disclosed in this specification and the appended claims should fall within the scope of the present invention.

What is claimed is:

1. A hydraulic braking system, comprising:
a base having an oil chamber and a connecting hole provided therein, wherein an end of the connecting hole communicates with the oil chamber, while another end thereof communicates with an outside of the base;
a seat provided in the oil chamber, wherein the seat has a receiving space communicating with the oil chamber and the connecting hole;
a check valve provided in the receiving space and the connecting hole, wherein the check valve is rod-shaped, and is movable between a first position and a second position; the check valve has a passage, which has an inlet and an outlet, wherein the outlet communicates with the connecting hole, and the inlet communicates with the receiving space when the check valve is located at the second position; the inlet does not communicate with the receiving space when the check valve is located at the first position; and
an elastic member provided in the receiving space of the seat, wherein, in a normal condition, the elastic member urges the check valve to stay at the first position by pushing it;
wherein the hydraulic braking system further comprises a connecting pipe, and a pushing portion is provided at an end of the connecting pipe; an end of the check valve extends into the connecting hole to be pushed by the pushing portion of the connecting pipe, whereby to move the check valve to the second position.

2. The hydraulic braking system of claim 1, wherein the seat comprises a tubular body and a flange; the tubular body has the receiving space; the flange is connected to a bottom edge of the tubular body, and extends outwardly; the check structure comprises a spring, wherein an end thereof abuts against the flange, which makes the seat abut against an inner wall of the oil chamber; the receiving space communicates with the connecting hole.

3. The hydraulic braking system of claim 2, wherein the check valve comprises a rod and a blocking flange; the rod has the passage, and is provided in the receiving space and the connecting hole; the blocking flange is connected to an end of the rod; the elastic member comprises a spring, wherein an end thereof abuts against the blocking flange of the check valve, while another end thereof abuts against an inner wall of the tubular body.

4. The hydraulic braking system of claim 3, further comprising an O-ring fitting around the rod, wherein the O-ring abuts against the rod and the inner wall of the tubular body.

5. The hydraulic braking system of claim 2, wherein the tubular body has at least one bore communicating with the receiving space and the oil chamber.

6. A hydraulic braking system, comprising:
a base having an oil chamber and a connecting hole provided therein, wherein the base further has a neck passage that communicate the oil chamber and the connecting hole;
a seat provided in the oil chamber, wherein the seat has a receiving space communicating with the oil chamber and the connecting hole;
a check valve comprising a rod passing through the neck passage, wherein at least one groove is recessed into an outer peripheral surface of the rod; the at least one groove has a first end located on an end surface of the rod and a second end located on a predetermined portion of the outer peripheral surface, wherein the first end communicates with the connecting hole; the check valve is movable between a first position and a second position; and
an elastic member provided in the receiving space of the seat, wherein, in a normal condition, the elastic member urges the check valve to stay at the first position by pushing against the check valve; when the check valve is located at the first position, the second end thereof dis-communicates with the oil chamber; when the check valve is located at the second position, the second end thereof communicates with the oil chamber.

7. The hydraulic braking system of claim 6, wherein the at least one groove of the check valve is provided in an axial direction of the rod.

8. The hydraulic braking system of claim 6, wherein the seat comprises a tubular body and a flange; the tubular body has the receiving space; the flange is connected to a bottom of the tubular body, and extends outwardly; an end of a spring abuts against the flange to make the seat abut against an inner wall of the oil chamber.

9. The hydraulic braking system of claim 8, wherein the check valve comprises a blocking flange connected to the rod; the blocking flange is located between the second end of the at least one groove and another end surface of the rod opposite to the end surface provided with the first end; the elastic member comprises a spring, wherein an end of the spring abuts against the blocking flange, while another end of the spring abuts against an inner wall of the tubular body.

10. The hydraulic braking system of claim 9, further comprising an O-ring fitting around the rod, wherein the O-ring abuts against the inner wall of the tubular body and the blocking flange.

11. The hydraulic braking system of claim 6, wherein an end of the rod of the check valve extends into the connecting hole; a pushing portion is provided at an end of a connecting pipe; the pushing portion of the connecting pipe abuts against the end of the rod extending into the connecting hole, and pushes the check valve backward to the second position.

12. The hydraulic braking system of claim 8, wherein the tubular body has at least one bore communicating the receiving space and the oil chamber.

13. A hydraulic braking system, comprising:
- a base having an oil chamber and a connecting hole provided therein, wherein an end of the connecting hole communicates with the oil chamber, while another end thereof communicates with outside of the base;
- a seat provided in the oil chamber, wherein the seat has a receiving space communicating with the oil chamber and the connecting hole;
- a check valve provided in the receiving space and the connecting hole, wherein the check valve is rod-shaped, and is movable between a first position and a second position; the check valve has a passage, which has an inlet and an outlet, wherein the outlet communicates with the connecting hole, and the inlet communicates with the receiving space when the check valve is located at the second position; the inlet does not communicate with the receiving space when the check valve is located at the first position; and
- a first spring provided in the receiving space of the seat, wherein, in a normal condition, the first spring urges the check valve to stay at the first position by pushing it;
- wherein the check structure comprises a second spring, wherein an end thereof abuts against an outer peripheral of the seat, and another end thereof abuts against an inner wall of the oil chamber; the first spring and the second spring respectively have a different elastic modulus; the receiving space communicates with the connecting hole.

14. The hydraulic braking system of claim 13, wherein the check valve comprises a rod and a blocking flange; the rod has the passage, and is provided in the receiving space and the connecting hole; the blocking flange is connected to an end of the rod; the first spring comprises a second spring, wherein an end thereof abuts against the blocking flange of the check valve, while another end thereof abuts against an inner wall of the seat.

15. The hydraulic braking system of claim 14, further comprising an O-ring fitting around the rod, wherein the O-ring abuts against the rod and the inner wall of the seat.

16. The hydraulic braking system of claim 13, wherein the seat has at least one bore communicating with the receiving space and the oil chamber.

* * * * *